United States Patent
Toensing

[11] Patent Number: 6,166,886
[45] Date of Patent: Dec. 26, 2000

[54] SWAGELESS HEAD SUSPENSION AND METHOD OF ASSEMBLY THEREFOR

[75] Inventor: Eyvand E. Toensing, Savage, Minn.

[73] Assignee: Seagate Technology LLC, Scotts Valley, Calif.

[21] Appl. No.: 09/149,232

[22] Filed: Sep. 8, 1998

Related U.S. Application Data

[60] Provisional application No. 60/078,824, Mar. 20, 1998.

[51] Int. Cl.[7] .................. G11B 5/48; G11B 21/16
[52] U.S. Cl. .............. 360/244.5; 360/245; 360/245.2; 360/245.4
[58] Field of Search .............. 360/104, 244.5, 360/245, 245.2, 245.4

[56] References Cited

U.S. PATENT DOCUMENTS

| | | | |
|---|---|---|---|
| 4,884,154 | 11/1989 | Onodera et al. | 360/104 |
| 4,901,175 | 2/1990 | Ito et al. | 360/104 |
| 4,947,185 | 8/1990 | Mitsushima et al. | 346/76 |
| 4,991,045 | 2/1991 | Oberg | 360/104 |
| 5,268,805 | 12/1993 | Peng et al. | 360/104 |
| 5,404,636 | 4/1995 | Stephansky | 360/104 |
| 5,721,652 | 2/1998 | Jessop et al. | 360/104 |
| 5,781,380 | 7/1998 | Berding et al. | 360/104 |
| 5,956,211 | 9/1999 | Adley | 360/104 |

FOREIGN PATENT DOCUMENTS

| | | | |
|---|---|---|---|
| 000557710 | 9/1993 | European Pat. Off. | 360/104 |
| 0000963 | 1/1986 | Japan | 360/104 |
| 002280060 | 1/1995 | United Kingdom | 360/104 |
| WO 094019795 A1 | 1/1994 | WIPO | 360/104 |

*Primary Examiner*—William Klimowicz
*Assistant Examiner*—Franklin D. Altman, III
*Attorney, Agent, or Firm*—Westman, Champlin & Kelly P.A.

[57] ABSTRACT

An actuator block for supporting suspension assemblies of a data storage system for read or write operations. The suspensions assemblies are coupled to an actuator arm of the actuator block via a mounting plate. The mounting plate is formed of a generally flat planar member coupled to a first end of the suspension assembly and defining upper and lower surfaces and sides. The mounting plate is coupled to the actuator arm along sides of the mounting plate to secure the suspension assemblies to the actuator block for operation without imparting a significant force to the suspension assembly along a load axis of the suspension assembly.

16 Claims, 8 Drawing Sheets

SWAGELESS HEAD SUSPENSION AND METHOD OF ASSEMBLY THEREFOR

CROSS-REFERENCE TO RELATED APPLICATION

The invention claims priority to Provisional Application Ser. No. 60/078,824, filed Mar. 20, 1998, and entitled "SWAGELESS HGA SLOT MATING".

FIELD OF THE INVENTION

The present invention relates to a data storage system. In particular, the present invention relates to a suspension system for supporting a head relative to discs of a data storage system for operation.

BACKGROUND OF THE INVENTION

Disc drives are well-known in the industry. Disc drives are used to store digital information on rigid discs coated with a magnetizable material in a plurality of circular, concentric data tracks. Discs are mounted on a spindle motor which rotates the discs for operation. Information is read from or written to the disc surface via transducers carried on a slider supported relative to the disc surface via a suspension assembly.

The suspension assembly includes a load beam and a gimbal spring for supporting the slider. The gimbal spring flexibly couples the slider to the load beam. The lower surface of the slider defines an air bearing surface. Rotation of a disc via the spindle motor interacts with the air bearing surface of the slider to create a hydrodynamic lifting force to lift the slider to fly above the disc surface for reading information from and writing information to the disc surface. The gimbal spring supports the slider to allow the slider to pitch and roll relative to the disc surface for operation. The load beam supplies a preload force to counteract the hydrodynamic lifting force of the slider. The preload force supplied by the load beam and the hydrodynamic lifting force created by the air bearing surface and rotation of the disc define the fly characteristics of the slider (and transducer) above the disc surface for proximate recording.

The slider is positioned relative to various concentric data tracks via an actuator mechanism. The actuator mechanism typically includes an "E-block" assembly, which is rotationally coupled to a base of the disc drive to define a rotary-type actuator. The E-block includes a plurality of spaced actuator arms and is rotationally operated via an actuator drive under the control of electronic circuitry. In particular, the suspension assemblies supporting the sliders are coupled to actuator arms of an E-block in alignment with upper and lower surfaces of discs supported by the spindle motor.

The suspension assemblies are typically coupled to the actuator arms via a swaging technique. In particular, prior suspension assemblies have included tubular-shaped stakes having an opened central channel extending therethrough for swaging suspension assemblies to actuator arms. The outer dimension of the stake is sized for insertion into a hole extending through an actuator arm of the E-block. After the stake is inserted into the hole, the stake is swaged to the hole of the actuator arm via a swaging device to secure the suspension assembly to the actuator arm. The swaging device is inserted through the central channel in a direction co-axial with the load axis to impart a swaging force to deform the stakes against a wall of the hole. Since the swaging device operates co-axial to the load axis and supplies a force to the stakes elevated from the longitudinal plane of the suspension assembly, the swaging force may alter the preload force of the suspension assembly, thus affecting operation of the disc drive.

Disc drive capacity is increasing and certain forces imparted to the suspension assembly during assembly, such as that imparted by previous swaging techniques, may have a greater influence on the preload force of the suspension assembly and have a greater impact or influence on the fly characteristics of smaller and lighter suspension assemblies which are more easily deformable. Thus, it is desirable to couple suspension assemblies relative to the actuator block without significant influence to the pre-load characteristics of the suspension assembly. The present invention provides a solution to this and other problems, and offers other advantages over the prior art.

SUMMARY OF THE INVENTION

The present invention relates to an actuator block for supporting suspension assemblies of a data storage system for read or write operations. The suspensions assemblies are coupled to an actuator arm of the actuator block via a mounting plate. The mounting plate is formed of a generally flat planar member coupled to a first end of the suspension assembly and defining upper and lower planar surfaces and sides. The mounting plate is coupled to the actuator arm along sides of the mounting plate to secure the suspension assemblies to the actuator block for operation without imparting a significant force to the suspension assembly along a load axis of the suspension assembly.

DETAILED DESCRIPTION OF THE PREFERRED EMBODIMENTS

Figure 1:
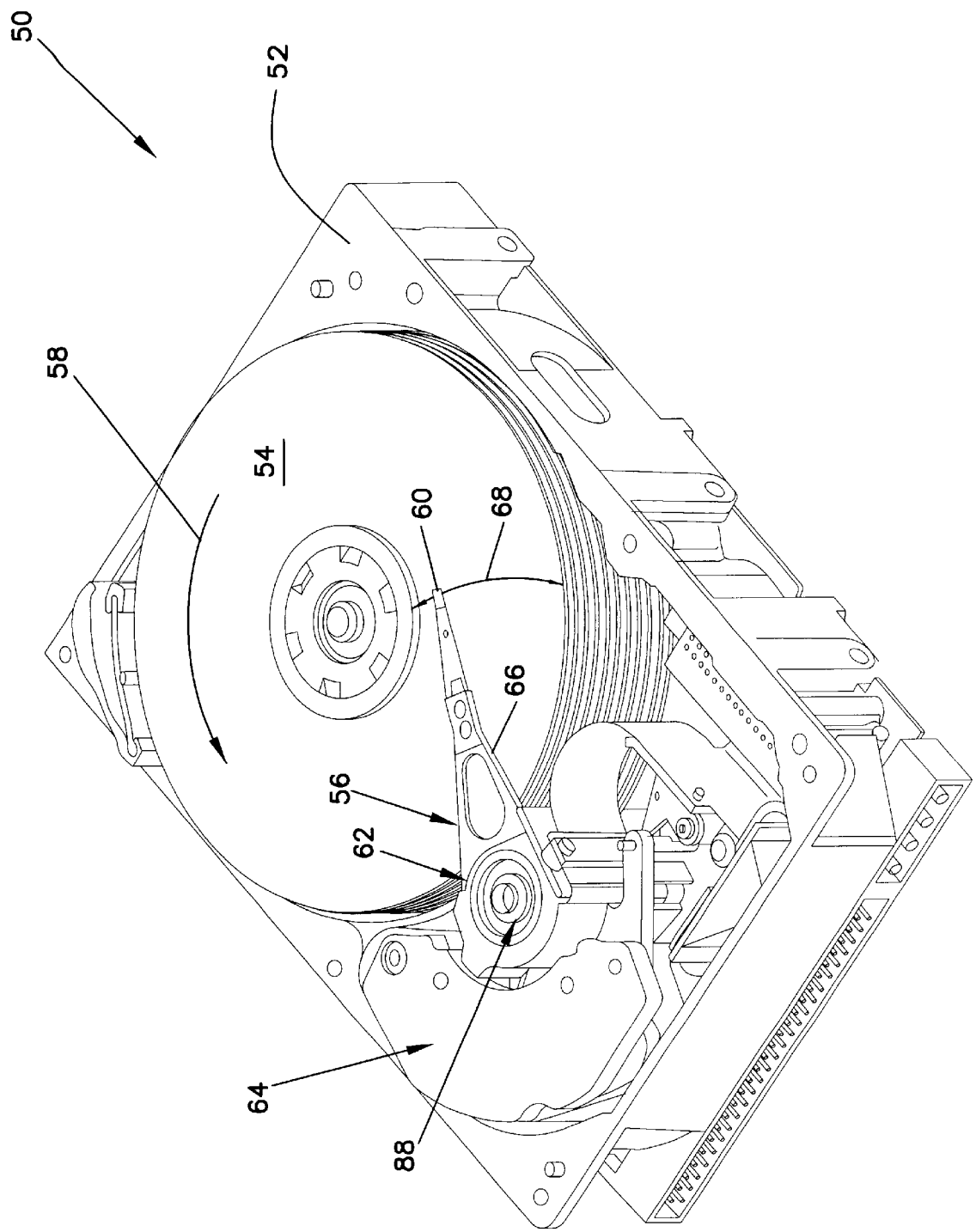
FIG. 1 is a perspective view of an embodiment of a data storage system.

The present invention has application for a data storage system as illustrated in FIG. 1. As illustrated, disc drive 50 includes chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 for reading and/or writing data to and from discs 54. The actuator assembly includes actuator block 62 and voice coil motor (VCM) 64. As shown, actuator block 62 is rotationally coupled to chassis 52. The actuator block 62 includes a plurality of actuator arms 66 (only one shown in FIG. 1) to support heads 60 relative to the disc surface. The actuator block rotates as illustrated by arrow 68 to move heads 60 along an arcuate path for placement relative to data tracks of a disc 54. Movement of the actuator block 62 is controlled by voice coil motor 64, which is coupled to control circuitry of the disc drive.

Figure 2:
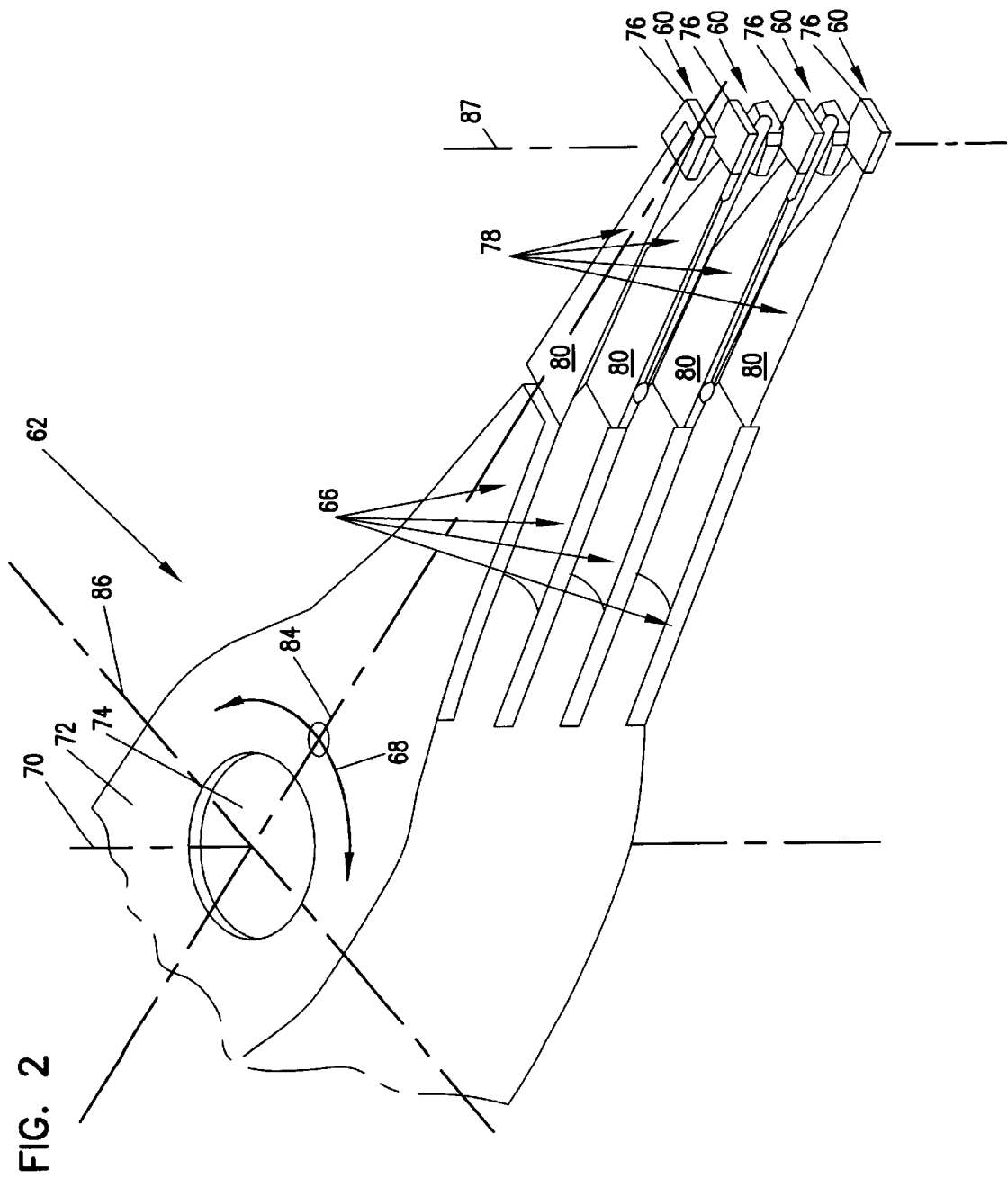
FIG. 2 is a perspective view of an embodiment of an actuator, or "E" block.

FIG. 2 is perspective illustration of the embodiment of actuator block 62 which rotates relative to axis 70. As shown, actuator block includes a main body portion 72 which includes a bearing bore 74. Actuator arms 66 extend from main portion 72 to support heads 60 to read and/or write data to discs. Although, four actuator arms 66 are shown in FIG. 2, the number of actuator arms is not limited to any specific number. Heads 60 include sliders 76 which support transducer elements (not shown) at a trailing edge of the slider 76. Heads are coupled to actuator arms 66 via suspension assemblies 78 including a load beam 80 and a gimbal spring 82. Actuator arms 66 and suspension assemblies 78 extend along a longitudinal axis 84. Actuator block 62 is rotated as illustrated by arrow 68 for movement transverse to the longitudinal axis 84 or relative to the lateral axis 86 via operation of the voice coil motor. For operation, load beam 80 provides a load force along a load axis 87 as will be explained. The actuator block is rotationally coupled to chassis 52 of the disc drive via a bearing 88 (shown in FIG. 1) extending through bearing channel 74. As shown, actuator arms 66 may support upper and/or lower suspension assemblies to support heads to read data from or write data to upper and lower sides of a dual-sided disc.

Figure 3:
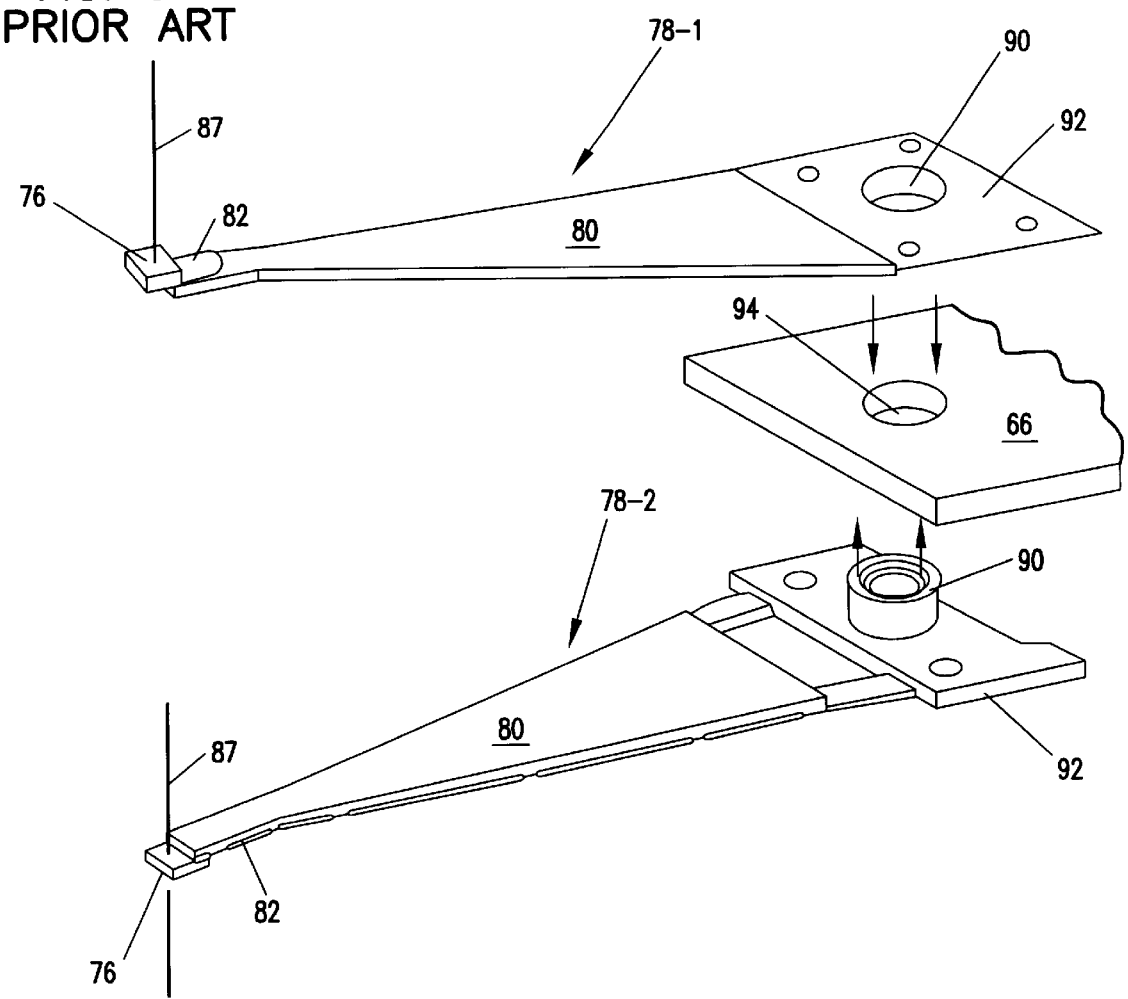
FIG. 3 is an exploded view of tubular shaped stakes coupled to suspension assemblies for attaching a suspension assemblies to actuator arms of an actuator block of the prior art.

FIG. 3 illustrates an embodiment of an actuator arm 66 of the prior art for supporting upper and lower suspension assemblies 78-1, 78-2 for reading and writing data to a lower and an upper disc surface. Suspension assemblies 78-1, 78-2 are swaged to actuator arm 66 via tubular shaped stakes 90 extending from a mounting plate 92 coupled to load beam 80. Tubular shaped stakes 90 are sized for insertion through a staking hole 94 of actuator arm 66. Tubular shaped stakes 90 of upper and lower suspension assemblies are inserted into staking hole 94 and deformed to engage walls of hole 94 to secure suspension assemblies 78-1, 78-2 to actuator arms 66. During the staking operation, a swaging device (not shown) operates along with the load axis 87 to the deform stakes 90 to the walls of hole 94. Operation of the swaging device to deform stakes 90 imparts a staking force to the stakes 90 which imparts a force to the mounting plate relative to the load axis which may alter pre-load of the suspension assembly.

Prior to operation of the disc drive, sliders 76 are parked on a landing zone of the disc surface. For operation, discs 54 rotate as illustrated by arrow 58 in FIG. 1, to create a hydrodynamic lifting force to lift the slider 76 to fly above the disc surface for proximity recording. The suspension assembly (i.e. load beam 80) supplies a pre-load force to the slider 72 along the load axis 87 to counteract the hydrodynamic lifting force. The balance of the hydrodynamic lifting force and load force of the suspension assembly define the fly height of the slider. As previously explained, staking force used to assembly previous suspensions may introduce significant variations in the pre-load force. Performance and storage capacity of disc drives are improving requiring more precise fly height control. Disc drive components are becoming smaller and lighter and such staking forces may create large variations in the pre-load force thus influencing operating and fly characteristics of the disc drive.

Figure 4:
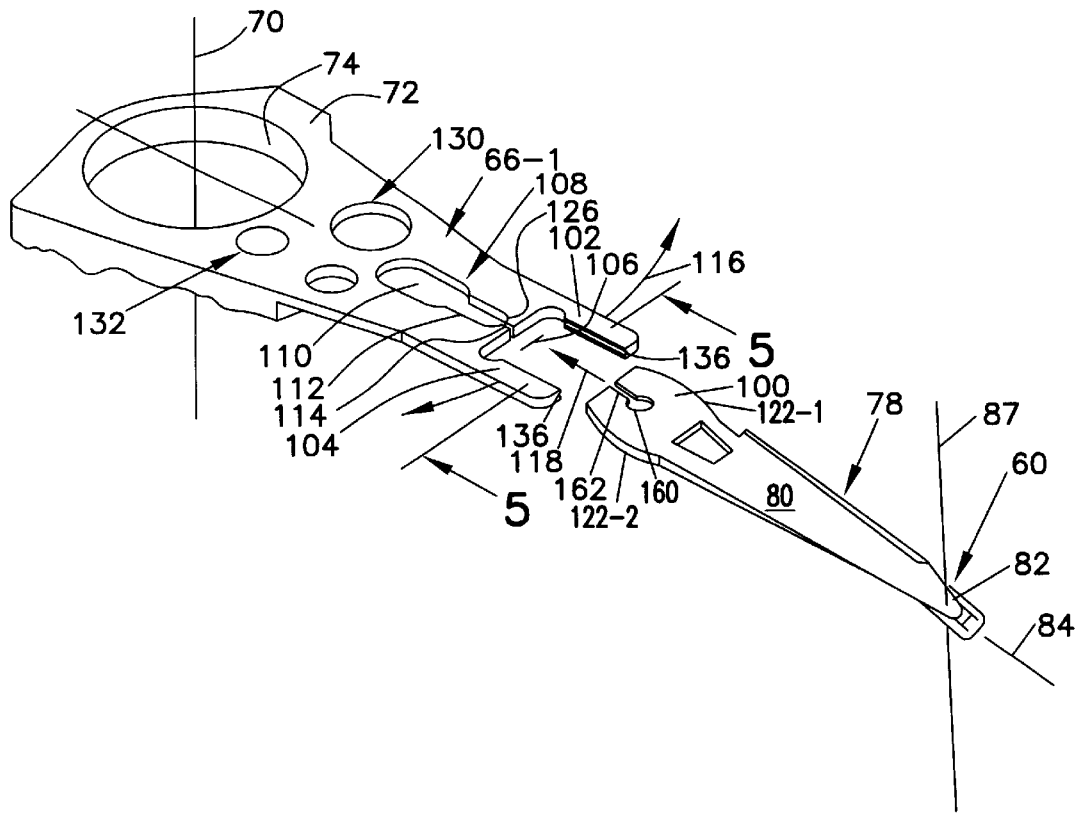
FIG. 4 is an exploded perspective view of an embodiment of a suspension assembly coupled to an actuator arm according to the present invention.

FIG. 4 illustrates a perspective view of an embodiment of a head support structure of the present invention where like numbers are used to identify like parts of the previous figures. As shown suspension assembly includes a stakeless mounting plate 100 which is operable coupled to actuator arm 66-1 via flexible fingers 102, 104. Fingers are formed of generally planar members at an extended end of the actuator arm 66-1 and are spaced to form mounting opening 106 therebetween. As shown, the actuator arm 66-1 and fingers 102, 104 are aligned along the longitudinal axis. Actuator arm 66-1 includes an elongated camming channel 108 including a first channel portion 110, a second channel portion 112 and through channel 114. Channel 114 is opened to opening 106 for flexure of fingers 102, 104 as illustrated via arrow 116.

Mounting plate 100 is sized relative to opening 106 and is inserted therein for assembly as illustrated by arrow 118. Mounting plate 100 is formed of a generally planar member having upper and lower planar surfaces and spaced sides therebetween 122-1, 122-2. Mounting plate is inserted into mounting opening 106 with sides 122-1, 122-2 aligned along the longitudinal axis in alignment with fingers 102, 104. The width of mounting plate 100 between opposed sides 122-1, 122-2 is sized slightly larger than opening 106 between fingers 102, 104. For example, the opening 106 may have a width of 0.220 inches (5.58 millimeters) and mounting plate 100 may have a width between sides 122-1, 122-2 of 0.224 inches (5.69 millimeters). The length of the mounting plate 100 is sized relative to the length of opening 106 for insertion therein. Suspension assemblies 78-1, 78-2 are formed of generally planar members and are coupled to upper and lower planar surfaces of mounting plate 100 and extend therefrom along the longitudinal axis to support heads 60 relative to the disc surface.

Fingers 102, 104 are normally supported in a first closed position. For assembly, a camming instrument (not shown in FIG. 4) is inserted into the camming channel 108. The camming dimension of the camming instrument is sized for insertion into channel portion 110. The camming dimension is sized larger than channel portion 112 to open or spread fingers 102, 104 to insert the slightly larger width mounting plate 100 in alignment with fingers 102, 104 so that fingers 102, 104 engage sides 122-1, 122-2 along the length thereof. Larger channel portion 110 includes curved surfaces 126 which bridge channel portion 110 and channel portion 112 to facilitate advancement of camming device into channel 112 for operation.

After mounting plate is inserted camming device is removed and fingers 102, 104 are released to engage sides 122-1, 122-2 of mounting plate 100 to secure mounting plate relative to actuator arm 66-1. Thus, as shown, fingers 102, 104 are biased against sides 122-1, 122-2 to provide generally balanced forces to retain mounting plate 100. Fingers 102, 104 engage sides 122-1, 122-2 along longitudinal axis generally co-planar with the mounting plate to limit application of a staking force which imparts a force to the suspension assembly along the load axis to limit influence to the pre-load force. Holes 130, 132 are included to reduce the mass of the actuator assembly for desired operating characteristics.

Figure 5:
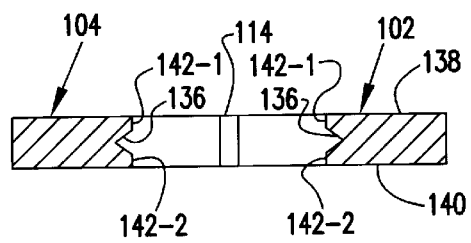
FIG. 5 is a cross-sectional view taken along line 5—5 of FIG. 4.
Figure 6:
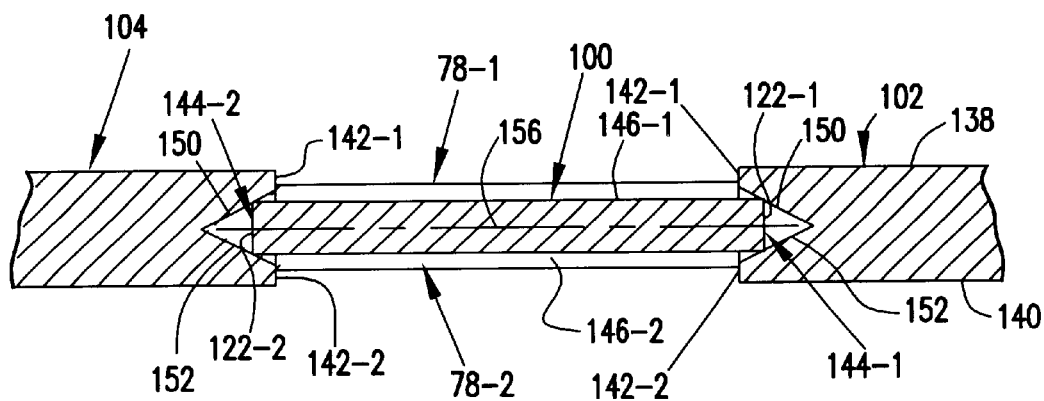
FIG. 6 is a cross-sectional view similar to FIG. 5 illustrating a mounting plate supported in an opening formed between spaced fingers coupled to the actuator arm.

As shown in FIGS. 4-6, fingers 102, 104 include elongated slots 136 extending along the length thereof along the longitudinal axis for securing mounting plate 100. Fingers 102, 104 are formed of a generally planar member having upper and lower planar surfaces 138, 140. Slots 136 are spaced from the planar surfaces 138, 140 to define upper and lower lips 142-1, 142-2 to separate slots 136 from upper and lower edge surfaces of the fingers 102, 104. As shown in FIG. 6, the sides 122-1, 122-2 of mounting plate 100 are formed of generally square edge surfaces 144-1, 144-2 generally perpendicular to upper and lower planar surfaces 146-1, 146-2 of the mounting plate 100. The thickness of edge surfaces 144-1, 144-2 are sized so that edges 144-1, 144-2 extend into slot 136 and are retained therein. Edges 144-1, 144-2 are permanently secured in slot 136 via epoxy or adhesive. Although a square edge is shown, the invention is not limited to a square edge.

Preferably, slots 136 are "V" shaped including converging sloped surfaces 150, 152. The converging sloped surfaces 150, 152 engage edge surfaces 144-1, 144-2 at an interference point based upon the thickness of edges 144-1, 144-2 and the slope of converging surfaces 150, 152 to limit movement of the mounting plate 100 along the load axis 87. Although a "V" shaped slot 136 is preferred, the invention is not limited to any particular shape.

As previously shown a single actuator arm 66 may support upper and lower suspension assemblies. Upper and lower suspension assemblies may be supported via a single mounting plate as illustrated in FIG. 4 or each suspension assembly may be supported by a separate mounting plate as illustrated by dashed line 156 in FIG. 6. If separate mounting plates are used, the thickness of each mounting plate is approximately half the size of a single mounting plate so that multiple mounting plates may be inserted into slot 136 and retained thereby.

Figure 7:
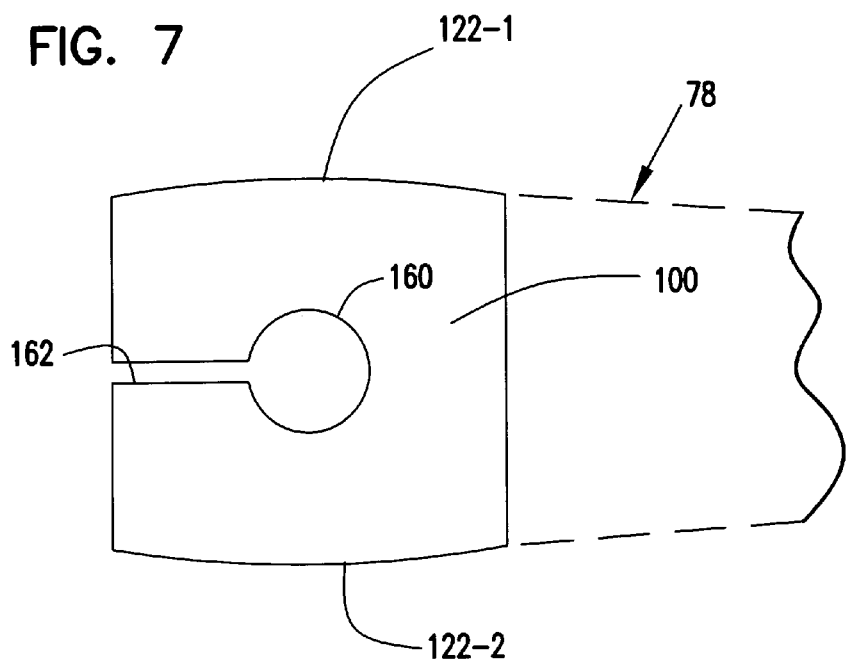
FIG. 7 is a top plan view of a mounting plate for coupling a suspension assembly to an actuator block.

FIG. 7 is a detailed illustration of mounting plate 100. In the embodiment shown sides 122-1, 122-2 are curved shaped as will be explained. Sides 122-1, 122-2 are curved to facilitate insertion and facilitate adjustment of the orientation of the mounting plate 100. Fingers 102, 104 contact a portion of the curved sides 122-1, 122-2 to secured sides 122-1, 122-2 and mounting plate 100 in opening 106. Mounting plate 100 includes a central alignment hole 160 opened to an edge of the mounting plate via slot 162. Slot 162 allows flexure of the sides 122-1, 122-2 of mounting plate 100 to facilitate insertion of mounting plate 100 in opening 106.

Figure 8:
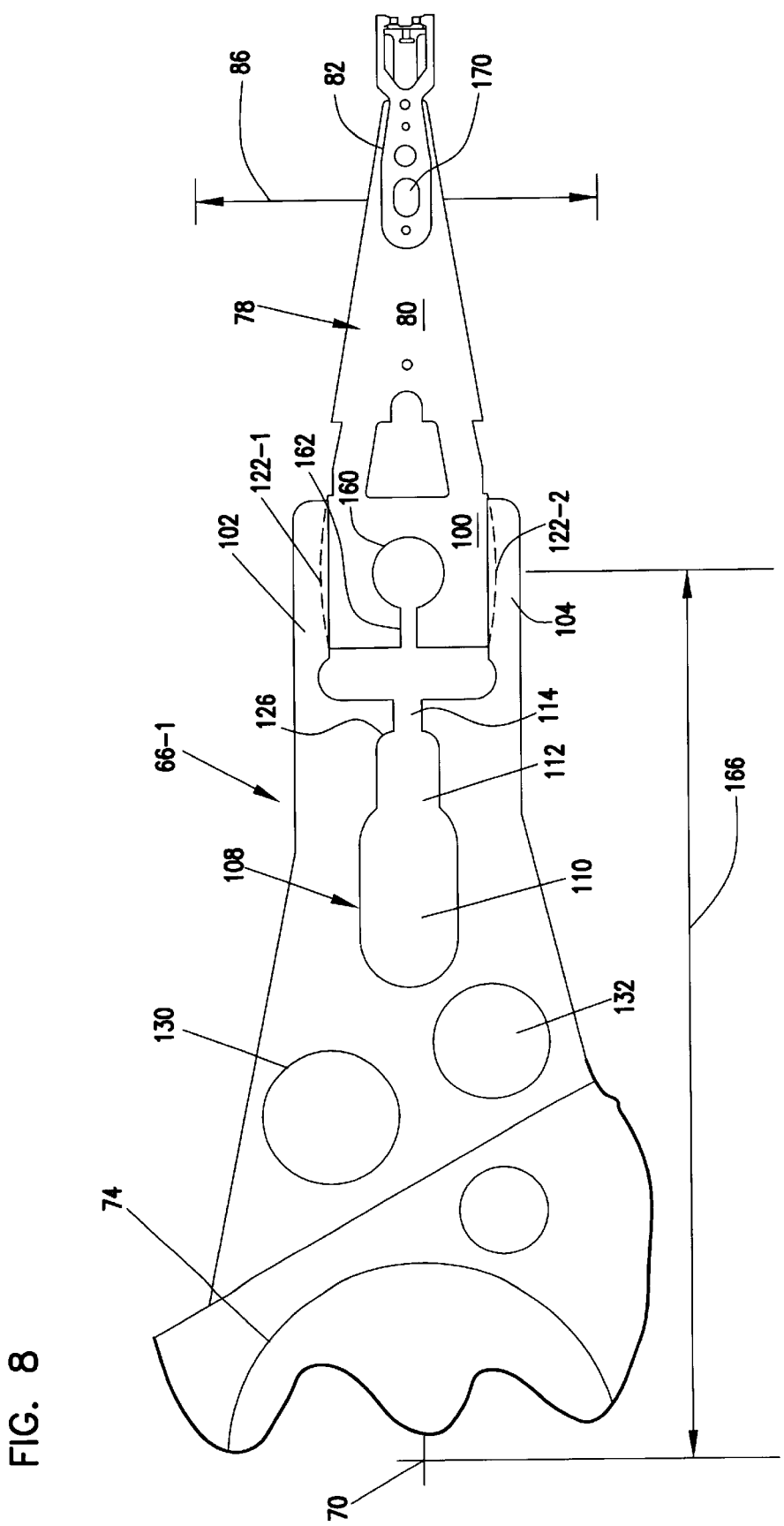
FIG. 8 is a top plan view of the embodiment of the actuator arm and suspension assembly coupled thereto of FIG. 4.

As illustrated in FIG. 8, hole 160 provides a reference point for aligning mounting plate 100 in opening 106 relative to bearing channel 74 to control reference dimension 166 along the longitudinal axis for coupling the suspension assembly to the actuator arm. The lateral (as illustrated by line 86) orientation of the mounting plate 100 and suspension is controlled via reference hole 170 at an extended end of suspension assembly 78. Preferably reference hole 170 extends through gimbal spring 82 and load beam 80.

Figure 9:
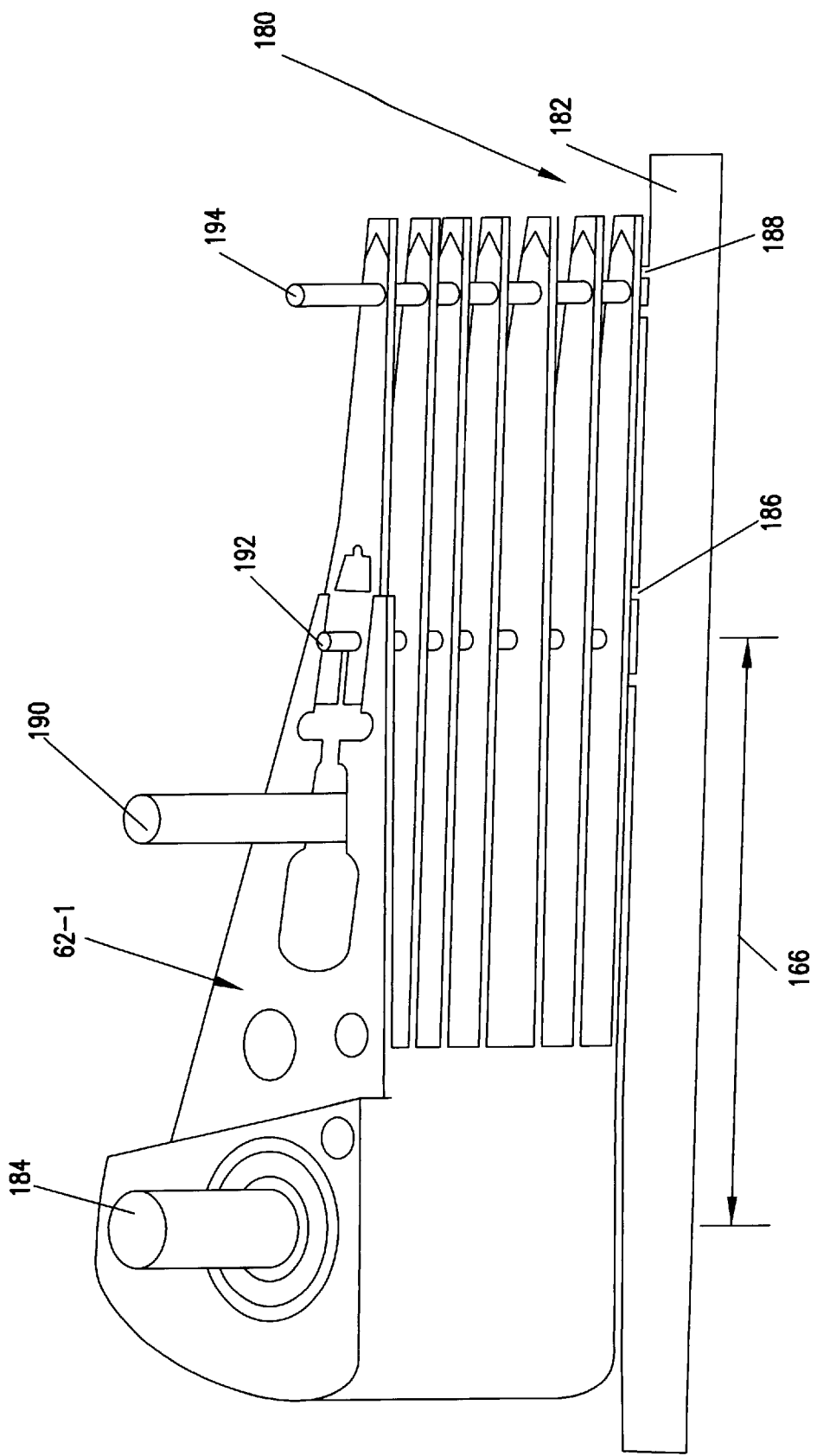
FIG. 9 illustrates an embodiment of an assembly fixture for attaching suspension assemblies to actuator arms of an actuator block of the present invention.

Actuator block 62-1 may be assembled via a fixture 180 as illustrated generally in FIG. 9. As shown, fixture 180 includes a base 182 and channel post 184. Base 182 include alignment pin stands 186, 188 (shown illustratively). The position of stands 186, 188 is fixed relative to post 184. For operation, a camming rod 190 is used to cam open or spread fingers 102, 104. The diameter of camming rod 190 is sized to sufficiently separate fingers 102, 104 for insertion of mounting plate 100. Although a cylindrical camming rod 190 is shown, it should be understood, that alternately shaped camming devices may be used. Alignment of mounting plate in opening 106 is measured via alignment rods 192, 194 adapted for insertion into a channel formed in stands 186, 188 as will be explained. Alignment rod 192 is inserted into mounting hole 160 to align mounting plate relative to fixed post 184. Rod 194 is inserted through hole 170 for lateral alignment of mounting plate 100 relative to axis 86.

Figure 10:
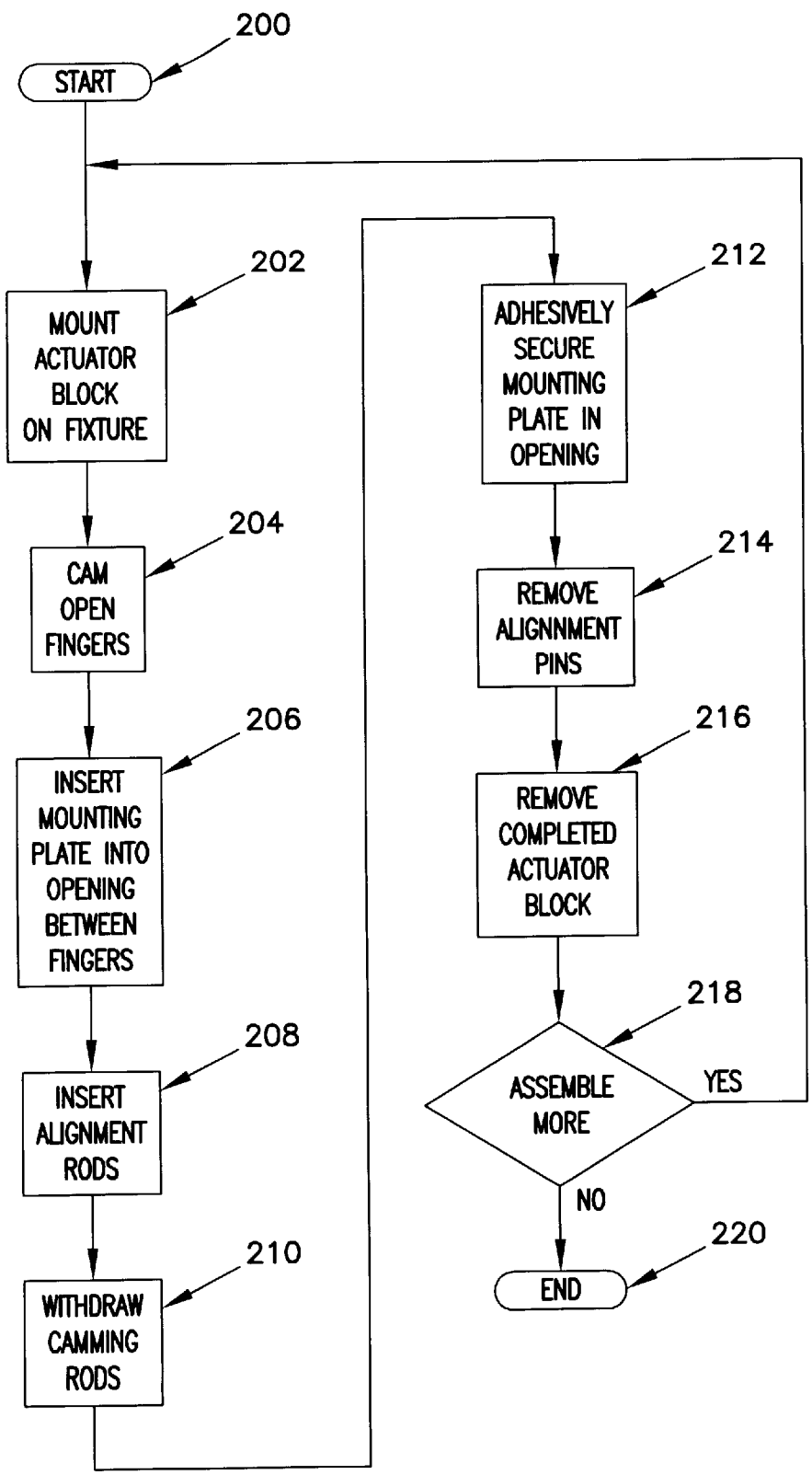
FIG. 10 is a flow chart illustrating steps for assembling an embodiment of an actuator block of the present invention.

FIG. 10 is a flow chart illustrating assembly of the actuator block via fixture 180. As shown, assembly commences as illustrated by block 200 and an actuator block is mounted to fixture 180 by inserting post 184 through bearing channel 74 as illustrated by block 202. Camming rod 190 is inserted into channel 108 to open or spread fingers 102, 104 as illustrated by block 204. Thereafter mounting plates 100 are inserted into openings 106 for each actuator arm 66 as illustrated by block 206.

Alignment rod 192 is inserted through hole 160 and alignment rod 194 is inserted through hole 170 as illustrated by block 208. If alignment is not correct, rods 192 and 194 will not be insertable through each hole 160, 170, respectively and into stands 186, 188, respectively. If the mounting plate 100 is not properly orientated, the position of mounting plates 100 is adjusted. The curved sides 122-1, 122-2 facilitate lateral adjustment of the mounting plate 100 in opening 106. After mounting plate 100 is properly aligned, camming rod 190 is removed as illustrated by block 210.

To secure mounting plate, an adhesive is applied as illustrated by block 212. Adhesive is applied to through channel 114 to close and lock fingers 102, 104 to bias against curved sides 122-1, 122-2 to secure mounting plate 100 relative to actuator arm 66. Adhesive may be wicked between sides edge surfaces and slot 136 to secure mount plate 100 to actuator block. The curved surfaces facilitate application of adhesive to secure mounting plate 100. Preferably, adhesive is a heat activated adhesive and the actuator block is heated to cure the adhesive. After assembly is complete, pins 192, 194 are removed as illustrated by block 214. Multiple actuator blocks may be assembled as illustrated by block 218. After assembly of the desired actuator blocks, operation is complete as illustrated by block 220.

The actuator block 62 supports heads 60 via a suspension assemblies 78 coupled to actuator arms 66 and extending along a longitudinal axis 84. A mounting plate 100 is coupled to the suspension assembly which includes upper and lower planar surfaces and longitudinally aligned sides 122-1, 122-2. Longitudinally aligned fingers 102, 104 are coupled to the actuator arm 66 for securing the mounting plate 100 to couple the suspension assembly 78 to the actuator block 62. Fingers 102, 104 are spaced to define an opening 106 sized for insertion of mounting plate 100. Mounting plate 100 is insertable in opening 106 so that longitudinally aligned sides 122-1, 122-2 are engaged by fingers 102, 104 to secure mounting plate via a balanced retaining force without supplying or imparting a force to the suspension assembly along the load axis 87 to limit influence to the pre-load force. The present invention has particular application to suspension assemblies supported via a lightweight and a relatively bendable member but is not limited to such applications.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, like an optical drive system, without departing from the scope and spirit of the present invention.

What is claimed is:

1. An actuator block for supporting heads of a data storage system for read or write operations comprising:

an actuator body;

at least one actuator arm extending from the actuator body along a longitudinal axis;

a head suspension which supports a head to read or write;

a mounting plate coupled to the head suspension having a plate length aligned with the longitudinal axis and a plate width transverse to the plate length and including opposed sides having curved surface portions, and the curved surface portions arranged to provide a varied plate width dimension along a portion of the plate length of the mounting plate;

and opposed spaced fingers coupled to the actuator arm and including longitudinally extending edge surfaces adapted to engage the opposed sides of the mounting plate along the curved surface portions.

2. The actuator block of claim 1 wherein the edge surfaces of the fingers include an elongated slot along a longitudinal length of the edge surfaces and the opposed sides of the mounting plate have an edge surface thickness sized for insertion into the slot to secure the mounting plate relative to the actuator arm.

3. The actuator block of claim 2 wherein the slot is "V" shaped.

4. The actuator block of claim 2 wherein the opposed sides of the mounting plate have generally square shaped edge surfaces.

5. The actuator block of claim 2 wherein the fingers include upper and lower planar surfaces and the slot includes a slot opening spaced from the upper and lower planar surfaces to form lips separating the slot from the upper and lower planar surfaces.

6. The actuator block of claim 1 wherein the fingers are flexibly coupled to the actuator arm and wherein the actuator arm further comprises a camming channel operably coupled to the fingers to separate the fingers to insert the mounting plate for assembly.

7. The actuator block of claim 6 wherein the camming channel comprises a first channel portion and a second channel portion, the first channel portion has a dimension sized to facilitate insertion of a camming device and the second channel portion has a dimension sized smaller than the dimension of the first channel portion so that insertion of a camming device therein flexibly separates fingers for insertion of the mounting plate.

8. The actuator block of claim 1 wherein the mounting plate includes an alignment hole.

9. A method of assembling suspension assemblies to an actuator block comprising steps of:

(a) providing an actuator block including at least one actuator arm, the actuator arm including spaced fingers coupled thereto forming a mounting opening therebetween, the fingers and the actuator arm extending along a longitudinal axis;

(b) providing a head suspension supporting a head and a mounting plate coupled to the head suspension, the mounting plate including opposed spaced sides having curved surface portions;

(c) inserting the mounting plate into the mounting opening so that the opposed spaced sides of the mounting plate are aligned between the spaced fingers; and (d) laterally positioning the mounting plate via adjustment of the orientation of the curved surface portions.

10. The method of claim 9 and further comprising steps of:

(e) spreading the fingers to increase the spacing between the fingers prior to insertion of the mounting plate; and (f) releasing the fingers to engage the sides of the mounting plate to secure the mounting plate between the spaced fingers.

11. The method of claim 9 wherein the step of laterally positioning the mounting plate further comprises a step of:

(e) aligning the mounting plate via a reference hole on the head suspension.

12. The method of claim 10 further comprising a step of:

(e) aligning the mounting plate via a reference hole on the mounting plate.

13. The method of claim 9 further comprising steps of:

(e) adhesively securing the mounting plate to the spaced fingers.

14. The method of claim 9 further comprising steps of:

(e) providing a fixture to assemble the mounting plate relative to the fingers, the fixture including a base and a post;

(f) mounting the actuator block on the fixture and inserting the post through a channel of the actuator block;

(g) providing a camming channel coupled to the fingers;

(h) providing a camming device adapted for insertion into the camming channel;

(i) inserting the camming device through the camming channel to spread the fingers to increase the spacing between the fingers to insert the mounting plate;

(j) inserting the mounting plate into the mounting opening between spaced fingers; and (k) removing the camming device to release the fingers to engage the mounting plate.

15. The method of claim 14 further comprising steps of:

(l) inserting an alignment pin through a reference hole to align the mounting plate.

16. The actuator block of claim 1 wherein the mounting plate includes a flexure channel.

* * * * *